(12) United States Patent
Kim et al.

(10) Patent No.: US 11,907,578 B2
(45) Date of Patent: Feb. 20, 2024

(54) PROCESSING-IN-MEMORY CONTROL METHOD FOR EFFICIENT INSTRUCTION PROCESSING AND COMPUTING DEVICE APPLYING SAME

(71) Applicant: KOREA ELECTRONICS TECHNOLOGY INSTITUTE, Seongnam-si (KR)

(72) Inventors: Young Kyu Kim, Seongnam-si (KR); Byung Soo Kim, Yongin-si (KR); Young Jong Jang, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 210 days.

(21) Appl. No.: 17/587,239

(22) Filed: Jan. 28, 2022

(65) Prior Publication Data
US 2022/0156011 A1 May 19, 2022

Related U.S. Application Data

(63) Continuation of application No. PCT/KR2019/012758, filed on Sep. 30, 2019.

(30) Foreign Application Priority Data

Jul. 29, 2019 (KR) .......................... 10-2019-0091654

(51) Int. Cl.
*G06F 3/06* (2006.01)
*G06F 9/30* (2018.01)

(52) U.S. Cl.
CPC .......... *G06F 3/0659* (2013.01); *G06F 3/0626* (2013.01); *G06F 3/0673* (2013.01); *G06F 9/30043* (2013.01)

(58) Field of Classification Search
CPC .... G06F 3/0659; G06F 3/0626; G06F 3/0673; G06F 9/30043; G06F 9/30145;
(Continued)

(56) References Cited

U.S. PATENT DOCUMENTS 6,049,839 A * 4/2000 Fujii ....................... G06F 9/384
 710/1
9,619,235 B2 * 4/2017 Tomono .............. G06F 9/30145
(Continued)

FOREIGN PATENT DOCUMENTS

KR 10-0102418 B1 7/1996
KR 10-2017-0045098 A 4/2017
(Continued)

OTHER PUBLICATIONS

International Search Report dated Apr. 27, 2020 in International Application No. PCT/KR2019/012758.
(Continued)

*Primary Examiner* — Sean D Rossiter
(74) *Attorney, Agent, or Firm* — Knobbe Martens Olson & Bear LLP (57) ABSTRACT

The present disclosure relates to a method for classifying instructions according to the number of operands required for processing-in-memory instruction processing, and a computing device applying same. Efficient instruction processing in a processing-in-memory may include identifying the number of operands required when processing an instruction queuing to be processed, interpreting the instruction queuing to be processed and processing an instruction corresponding to the identified number of required operands. When the number of required operands is 0, the instruction interpretation may interpret the instruction queuing to be processed as a WRITE instruction, and the instruction processing may execute memory writing. When the number
(Continued)

of required operands is not 0, the instruction processing may execute memory reading in an internal memory of the processing-in-memory by the same number of times as the number of operands required in the instruction interpreted in the instruction interpretation.

8 Claims, 6 Drawing Sheets

(58) Field of Classification Search
CPC .. G06F 9/3016; G06F 15/7821; G06F 9/3004; G06F 9/30007
See application file for complete search history.

(56) References Cited

U.S. PATENT DOCUMENTS

| | | | |
|---|---|---|---|
| 2007/0192530 A1* | 8/2007 | Pedersen | G06F 12/0246 |
| | | | 711/E12.008 |
| 2008/0082788 A1* | 4/2008 | Veidenbaum | G06F 9/3836 |
| | | | 712/23 |
| 2015/0019840 A1* | 1/2015 | Anderson | G06F 9/3802 |
| | | | 712/206 |
| 2016/0098200 A1 | 4/2016 | Guz et al. | |
| 2021/0035258 A1* | 2/2021 | Ray | G06F 9/30036 |
| 2023/0298254 A1* | 9/2023 | Benthin | G06T 15/06 |
| | | | 345/418 |

FOREIGN PATENT DOCUMENTS

| | | |
|---|---|---|
| KR | 10-2017-0089678 A | 8/2017 |
| KR | 10-2017-0102418 A | 9/2017 |
| KR | 10-2018-0018269 A | 2/2018 |
| KR | 10-1867219 81 | 6/2018 |

OTHER PUBLICATIONS

Ahn et al., "PIM-Enabled Instructions: A Low-Overhead, Locality-Aware Processing-in-Memory Architecture" ISCA'15, Jun. 13-17, 2015, Portland, OR, USA, DOI: http:/dx.doi.org/10.1145/2749469.2750385.

* cited by examiner

FIG. 1

| INSTRUCTION | INSTRUCTION VALUE | NUMBER OF OPERANDS | DESCRIPTION OF INSTRUCTION |
|---|---|---|---|
| WRITE | 00 1111 | 0 | WRITE INSTRUCTION |
| READ | 10 0000 | 1 | READ INSTRUCTION |
| W_OR_I | 01 0001 | 1 | I-TYPE WRITE-AFTER-OR INSTRUCTION |
| W_NOR_I | 01 0010 | 1 | I-TYPE WRITE-AFTER-NOR INSTRUCTION |
| W_XOR_I | 01 0011 | 1 | I-TYPE WRITE-AFTER-XOR INSTRUCTION |
| W_AND_I | 01 0100 | 1 | I-TYPE WRITE-AFTER-AND INSTRUCTION |
| W_NAND_I | 01 0101 | 1 | I-TYPE WRITE-AFTER-NAND INSTRUCTION |
| W_ADD_I | 01 0110 | 1 | I-TYPE WRITE-AFTER-ADD INSTRUCTION |
| CAWGT_I | 01 0111 | 1 | I-TYPE WRITE-AFTER-COMPARE INSTRUCTION |
| CAWLT_I | 01 1000 | 1 | I-TYPE WRITE-AFTER-COMPARE INSTRUCTION |
| CAWEQ_I | 01 1001 | 1 | I-TYPE WRITE-AFTER-COMPARE INSTRUCTION |
| CAWZERE_I | 01 1010 | 1 | I-TYPE WRITE-AFTER-COMPARE INSTRUCTION |
| W_OR | 10 0001 | 2 | I-TYPE WRITE-AFTER-OR INSTRUCTION |
| W_NOR | 10 0010 | 2 | I-TYPE WRITE-AFTER-NOR INSTRUCTION |
| W_XOR | 10 0011 | 2 | I-TYPE WRITE-AFTER-XOR INSTRUCTION |
| W_AND | 10 0100 | 2 | I-TYPE WRITE-AFTER-AND INSTRUCTION |
| W_NAND | 10 0101 | 2 | I-TYPE WRITE-AFTER-NAND INSTRUCTION |
| W_ADD | 10 0110 | 2 | I-TYPE WRITE-AFTER-ADD INSTRUCTION |
| SORT | 11 0000 | 3 | INSTRUCTION FOR WRITING SORTED RESULT AFTER READING 2S OPERANDS ALL |

PROCESSING-IN-MEMORY CONTROL METHOD FOR EFFICIENT INSTRUCTION PROCESSING AND COMPUTING DEVICE APPLYING SAME

CROSS REFERENCE TO RELATED APPLICATIONS

This is a continuation application of International Patent Application No. PCT/KR2019/012758, filed on Sep. 30, 2019, which claims priority to Korean Patent Application No. 10-2019-0091654, filed on Jul. 29, 2019, the contents of both of which are incorporated herein by reference in their entireties.

BACKGROUND

Technical Field

The present disclosure relates to a processing-in-memory, and more particularly, to a processing-in-memory control method for efficient instruction processing and a computing device using the same.

Description of Related Technology

A processing-in-memory (PIM) is a next-generation memory integrated with a computing device (a processing unit) as a single chip, and improves system performance and power efficiency by reducing the frequency with which a processor access the memory to perform computations. Unlike the traditional memory approach, the PIM approach of a processor uses an instruction signal for computation in addition to address and data signals. When a PIM has high hardware complexity due to the computing device of processing instructions received from a processor, the memory performance of the PIM is degraded. Therefore, since the memory performance of the PIM should not be significantly degraded, the computing device requires as little hardware complexity as possible and thus supports only relatively simple computations.

SUMMARY

The present disclosure provides a method of classifying instructions according to the number of operands required for processing-in-memory instruction processing in order to overcome the disadvantages of the prior art, and also provides a computing device including a finite-state machine using the instruction classification method without following the traditional hardware structure of a computing device including a control unit and a data path of a processor.

In order to solve the above problems, the present disclosure provides a control method for classifying and processing instructions according to the number of operands and a computing device using the same.

In detail, according to a first feature of the present disclosure, there is provided a processing-in-memory control method for efficient instruction processing in a processing-in-memory, wherein the processing-in-memory control method includes operations of: determining the number of operands required when an instruction in a stand-by state is processed, interpreting an instruction being in a stand-by state, and processing the instruction corresponding to the number of required operands, wherein when the number of required operands determined in the operation of determining the number of required operands is zero, the operation of interpreting the instruction comprises interpreting the instruction being in the stand-by state as a WRITE instruction, and the operation of processing the instruction comprises performing a memory write, and when the number of required operands determined in the operation of determining the number of required operands is not zero, the operation of processing the instruction comprises performing a memory READ in an internal memory of the processing-in-memory a number of times equal to the number of operands required in the instruction interpreted in the operation of interpreting the instruction.

According to a second feature of the present disclosure, there is provided a processing-in-memory computing device for efficient instruction processing in a processing-in-memory, the processing-in-memory computing device including an instruction interpretation unit configured to determine the number of operands required for instruction processing, a first memory read unit performed by the instruction interpretation unit when the number of required operands is either one or two through instruction interpretation, a read response unit performed when the number of required operands is one and an instruction is a READ instruction, a second memory read unit performed when the number of required operands is two, a third memory read unit performed when the number of required operands is three, an instruction processing unit performed when the number of required operands is one and the instruction is not the READ instruction or when the number of required operands is two or more; and a memory write unit performed when the number of required operands is one except for the READ instruction.

Using the processing-in-memory control method for efficient instruction processing and the computing device using the same which are proposed by the present disclosure has the following advantages.

When the computing device of the processing-in-memory processes instructions, a finite-state machine reuses repeatedly used states, and thus it is possible to maintain the hardware complexity of the computing device regardless of the number of instructions.

That is, by maintaining as low hardware complexity as possible, it is possible to access as many operands as possible while maintaining the memory performance of the processing-in-memory. Therefore, the processing-in-memory exhibits a greater effect when used in intensive application programs and thus can be used more widely in various fields such as smart cars, Internet of Things, and wearable devices.

DETAILED DESCRIPTION

A computing device should access one or more operands to process a computation-related instruction. Actually the computation of the processing-in-memory is processed as an atomic operation or computation. Processing-in-memory is known to have the greatest benefit in terms of system realization when used in data-intensive application programs. Therefore, a computing device accessing as many operands as possible when it processes one instruction meets the design intent for the processing-in-memory.

As described above, since a general PIM design trend so far is that the computing device processes only relatively simple computations, the computing logic of the computing device is relatively simple. However, the computing device needs to access as many operands as necessary in accordance with an instruction, and thus the hardware complexity increases more than necessary when a conventional processor design method is applied to PIM. This is a problem caused by having to create a finite-state machine and a control unit for any instruction supported by the computing unit.

Advantages and features of the present disclosure and implementation methods thereof will be clarified through the following embodiments described in detail with reference to the accompanying drawings. However, the present disclosure is not limited to embodiments disclosed herein and may be implemented in various different forms. The embodiments are provided for making the disclosure of the prevention invention thorough and for fully conveying the scope of the present disclosure to those skilled in the art. It is to be noted that the scope of the present disclosure is defined by the claims. The terminology used herein is for the purpose of describing particular embodiments only and is not intended to be limiting of the invention. Herein, the singular shall be construed to include the plural, unless the context clearly indicates otherwise. The terms "comprises" and/or "comprising" used herein specify the presence of stated elements, steps, operations, and/or components but do not preclude the presence or addition of one or more other elements, steps, operations, and/or components.

Unless otherwise defined, all terms (including technical and scientific terms) used herein have the same meaning as commonly understood by one of ordinary skill in the art to which this invention belongs. Also, when certain embodiments can be implemented differently, functions or operations specified in specific blocks may be executed in a different order from that specified in the flowchart. For example, two consecutive blocks may be performed substantially simultaneously, or the blocks may be performed in reverse according to a related function or operation.

Hereinafter, the preferred embodiments of the present disclosure will be described in detail with reference to the accompanying drawings. In adding reference numerals to the components of each drawing, the same components are given the same reference numerals as much as possible even if they are shown on different drawings. In the description of the present disclosure, detailed descriptions of related known components or functions will be omitted if they may obscure the gist of the present disclosure.

Figure 1:
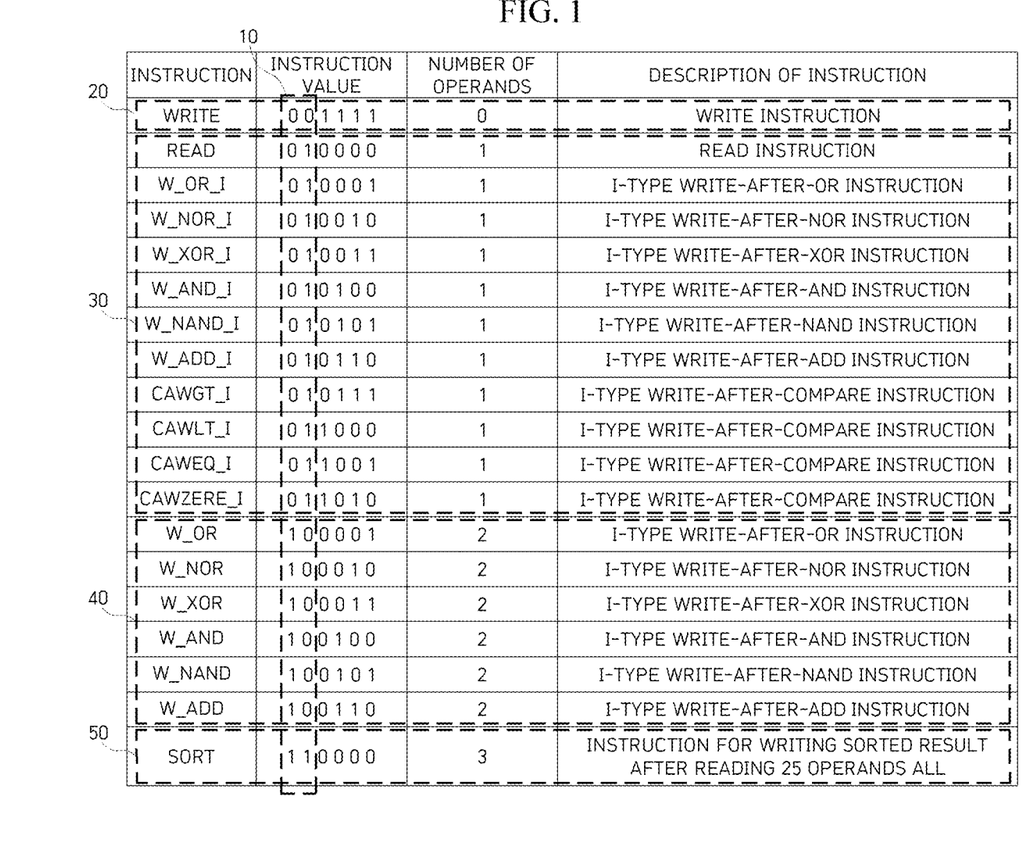
FIG. 1 is a diagram for classifying instructions in accordance with the number of operands according to the present disclosure.

FIG. 1 is a diagram illustrating a method of classifying instructions according to an embodiment of the present disclosure. The instructions described in FIG. 1 are examples, and the present disclosure is applicable regardless of the types and number of instructions.

The types of instructions according to this embodiment include a READ instruction and a WRITE instruction, which are basic functions of a memory, and an a Recall Type (R-type) instruction and Immediate Type (I-type) instruction for computation. Also, there is an Accelerate Type (A-type) instruction, which is an acceleration instruction for accelerating a specific computation. SORT instruction 50 of FIG. 1 is an example of the A-type instruction.

In an internal memory of the processing-in-memory, memory READ (or READ from memory) is performed a number of times equal to the number of operands required for each instruction. For example, the memory READ is performed in the internal memory of the processing-in-memory once when the number of operands required for a specific instruction is 1 (one), and twice when the number of operands is 2 (two).

Accordingly, instructions in the processing-in-memory are classified according to the number of operands required for each instruction. This has the same effect as when the instructions are classified on the basis of the READ operation of the internal memory.

In WRITE instruction, since the WRITE instruction accesses the internal memory once for a WRITE operation but does not require operands, the number of operands required for the WRITE instruction is 0 (zero). Also, one operand is required to process READ instruction and I-type instructions.

In addition, to process an R-type instruction, two operands for a source address (rs) and a destination address (rd) are required. Meanwhile, SORT, which is an A-type instruction, is an instruction for reading and processing three operands.

In this embodiment, an instruction value Opcode for an instruction is 6 bits, and the upper 2 bits of the instruction value are the number of operands required for instruction processing (See reference numeral 10).

However, the instruction value is not limited to six bits and may be variously set such as 8 bits or 16 bits, and it will be appreciated that the number of operands required for instruction processing may also be variously set to the upper 3 bits, 4 bits, etc.

When the upper two bits (Reference numeral 10) correspond to a binary value of 00, the number of operands required for the instruction is zero (Reference numeral 20), and this corresponds to a WRITE instruction.

When the upper two bits (Reference numeral 10) correspond to a binary value of 01, the number of operands required for the instruction is zero (Reference numeral 30), and this corresponds to a READ instruction and I-type instructions.

When the upper two bits (Reference numeral 10) correspond to a binary value of 10, the number of operands required for the instruction is two (Reference numeral 40), and this corresponds to R-type instructions.

When the upper two bits (Reference numeral 10) of SORT instruction are a binary value of 11, the number of operands required for the instruction is three (Reference numeral 50).

In addition, the number of required operands may also be variously set from 0 to 5, etc. instead of from 0 to 3 depending on the types of instruction and how the instruction value is set. Accordingly, it will be appreciated that the instruction classification may be implemented differently from this embodiment.

A method of processing an instruction in accordance with the number of operands required for instruction processing will be described in detail below.

Figure 2:
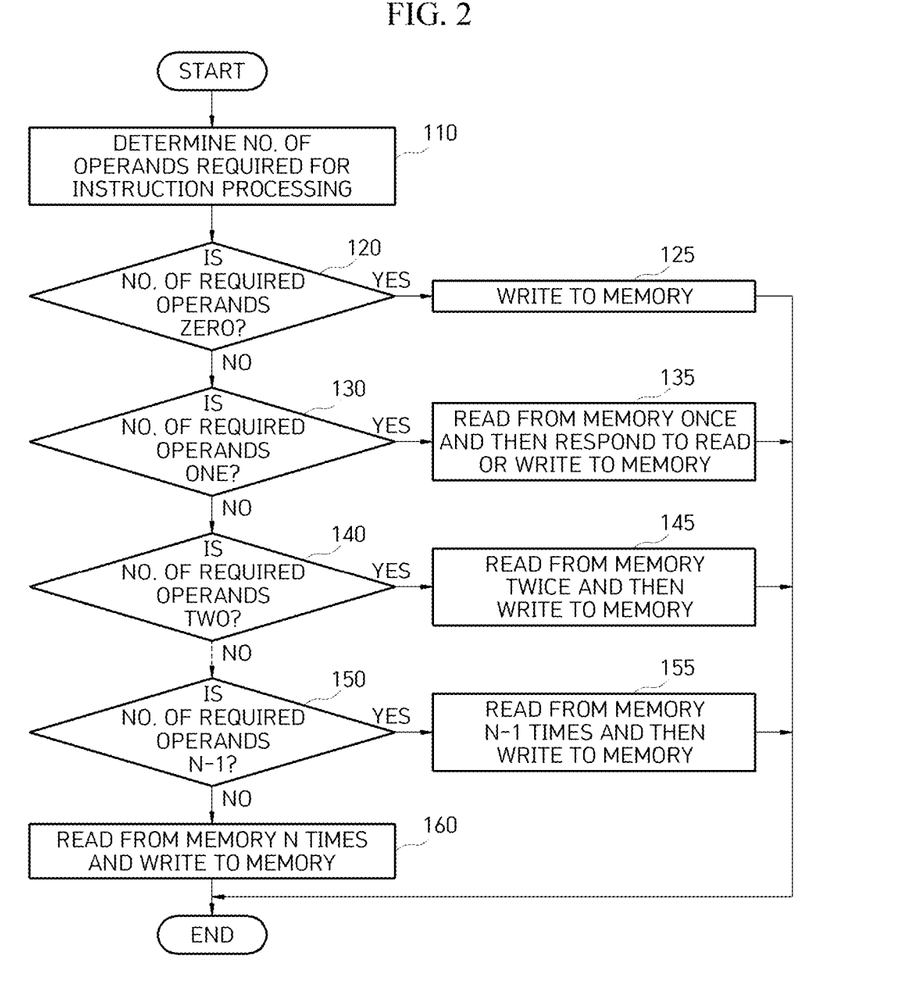
FIG. 2 is a schematic flowchart of a method of processing an instruction in accordance with the number of required operands according to an embodiment of the present disclosure.

FIG. 2 is a schematic flowchart of a method of processing an instruction in accordance with the number of required operands according to an embodiment of the present disclosure.

Specifically, FIG. 2 is a schematic flowchart of a method of processing an instruction when the maximum number of operands required for instruction processing is n among a plurality of instructions. In this case, n denotes a natural number of 3 or more.

First, as described above with reference to FIG. 1, the number of operands required when processing each instruction is determined (110).

Subsequently, it is determined whether the number of operands required for instruction processing is zero (120). When the number of required operands is zero, a WRITE instruction is provided, and the memory WRITE (or WRITE to memory) is performed (125).

When the number of required operands is not zero, it is determined whether the number of required operands is one (130). When the number of required operands is one, the instruction is a READ instruction or an I-type instruction. Thus, after the memory READ is performed once, a response to the READ or the memory WRITE is performed (135).

When the number of required operands is neither zero nor one, it is determined whether the number of required operands is two (140). When the number of required operands is two, the instruction is an R-type instruction. The memory READ is performed twice, and then the memory WRITE is performed (145).

In this way, the number of required operands is continuously checked, and it is determined whether the number of required operands is n−1 (150). When the number of required operands is n−1, the memory READ is performed n−1 times, and then the memory WRITE is performed (155).

In order to process an instruction in which the final number of required operands is n (the maximum number of operands required for instructions to be processed), the memory READ is performed n times, and then the memory WRITE is performed (160).

Figure 3:
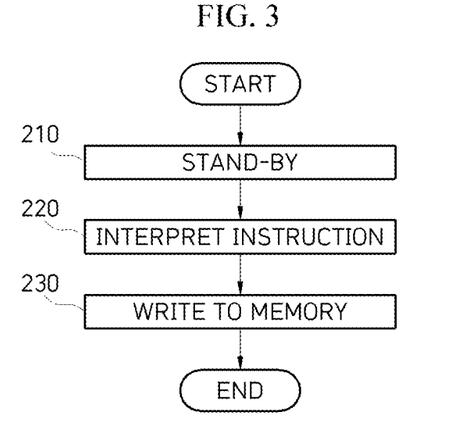
FIG. 3, FIG. 4, FIG. 5, and FIG. 6 are flowcharts of a method of processing instructions in accordance with a specific number of instructions according to an embodiment of the present disclosure.

FIG. 3 is a flowchart of a method of processing instructions when the number of required operands is zero. When the number of required operands is zero, the instruction is a WRITE instruction. The instruction is interpreted (220) in a stand-by state (210) before instruction processing, and the result is written to the memory (230).

Figure 4:
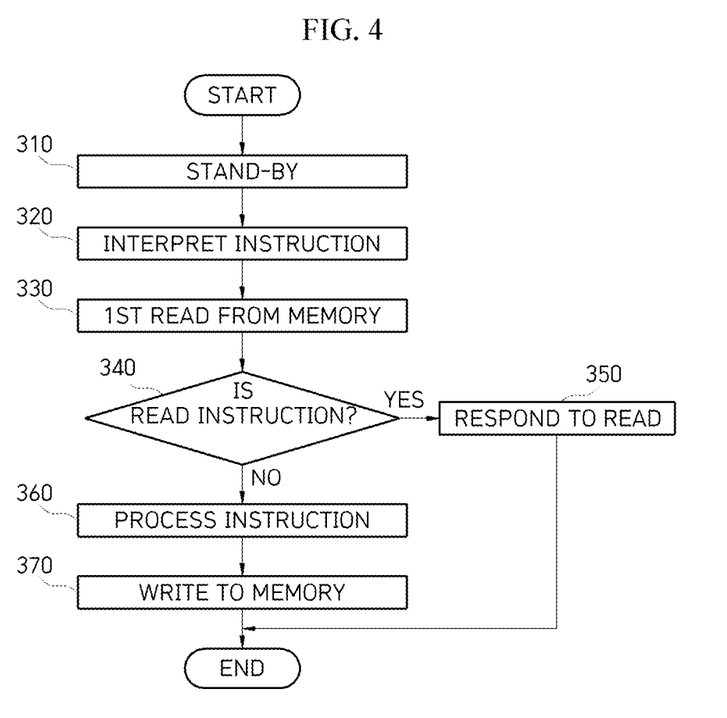

FIG. 4 is a flowchart of a method of processing instructions when the number of required operands is one. When the number of required operands is one, the instruction is a READ instruction or an I-type instruction. The instruction is interpreted (320) in a stand-by state (310) before instruction processing, and the memory READ is performed (330). Since the number of required operands is one, memory READ is performed once.

Then, it is determined whether the instruction is a READ instruction (340). When the instruction is a READ instruction, a response is made to the READ (350). When the instruction is not a READ instruction, the instruction is an I-type instruction, and therefore the instruction is processed (360) and the result is written to the memory (370).

Figure 5:
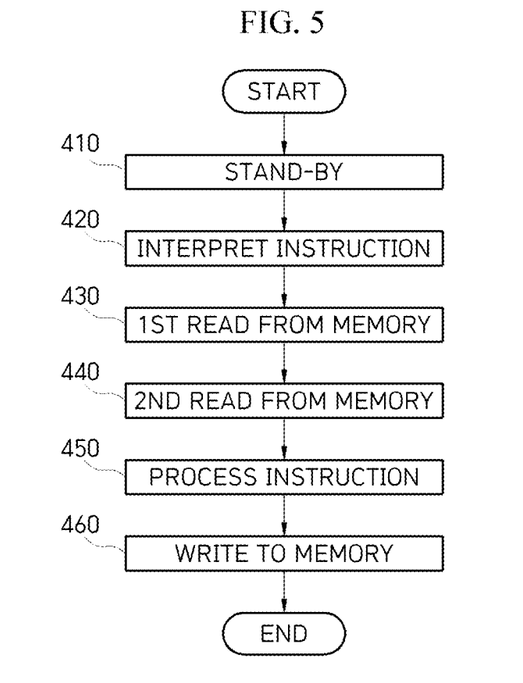

FIG. 5 is a flowchart of a method of processing instructions when the number of required operands is two. When the number of required operands is two, the instruction is an R-type instruction. The instruction is interpreted (420) in a stand-by state (410) before instruction processing, and the memory READ is first performed (430).

Since the number of required operands is two, the memory READ needs to be performed twice. Thus, after the first memory READ (430), the second memory READ is performed (440). Then, the corresponding instruction is processed (450), and the result is written to the memory (460).

Figure 6:
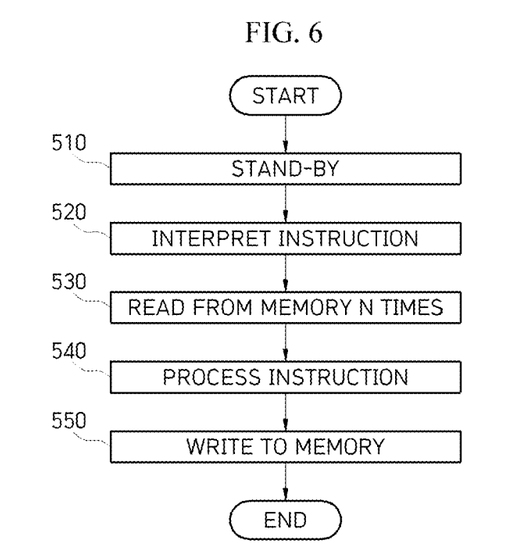

FIG. 6 is a flowchart of a method of processing instructions when the number of required operands is n. Here, as described above, n is a natural number greater than or equal to three. When the number of required operands is n, the instruction is an A-type instruction, which is an acceleration instruction. The instruction is interpreted (520) in a stand-by state (510) before instruction processing, and the memory READ is performed n times because the number of required operands is n (530). Then, the corresponding instruction is processed (540), and the result is written to the memory (550).

According to an embodiment, when the number of required operands is 3, the instruction is SORT which is an A-type instruction. The instruction is interpreted (520) in a stand-by state (510) before instruction processing, and the memory READ is performed three times. Then, the corresponding instruction is processed (540), and the result is written to the memory (550).

Figure 7:
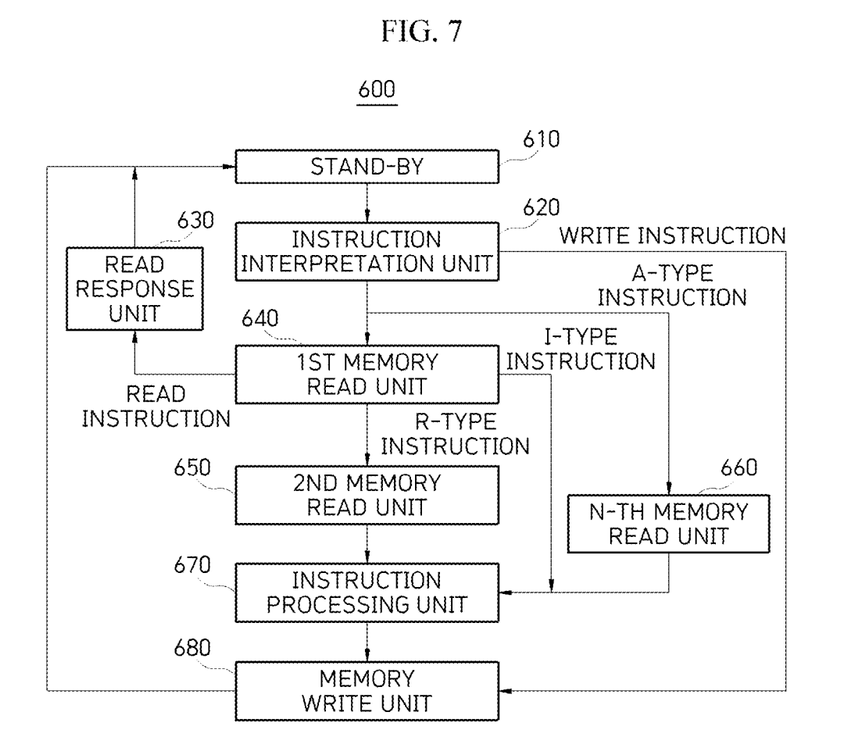
FIG. 7 is a diagram showing a finite-state machine of the computing device according to an embodiment of the present disclosure.

FIG. 7 shows a finite-state machine 600 of the computing device according to an embodiment of the present disclosure. The finite-state machine 600 performs a method of classifying instructions in accordance with the number of required operands and processing the instruction as described above.

Specifically, the finite-state machine 600 performs computations while transitioning to necessary states by instruction interpretation. In this case, it reuses repeatedly used states among the states required for instruction processing, and so the number of states used is minimized while the above-described instruction processing method is performed. Therefore, by maintaining as low hardware complexity as possible, it is possible to access as many operands as possible so that the processing-in-memory can be used in intensive application programs while maintaining the memory performance of the processing-in-memory.

In operation, first, instructions to be processed are in a stand-by state 610, and an instruction interpretation unit (or an instruction interpretation processor) 620 interprets the instructions. The instruction interpretation determines the next state to which the finite-state machine 600 will transition through upper bits of the instruction value of FIG. 1.

That is, when the upper two bits (See reference numeral 10 in FIG. 1) is a binary value of 00, the number of operands required for the instruction is zero (20 in FIG. 1), and this corresponds to a WRITE instruction. When the upper two bits (10 in FIG. 1) is a binary value of 01, the number of operands required for the instruction is one (30 in FIG. 1), and this corresponds to a READ instruction and an I-type instruction. When the upper two bits (10 in FIG. 1) is a binary value of 10, the number of operands required for the instruction is two (40 in FIG. 1), and this corresponds to an R-type instruction. When the upper two bits (10 in FIG. 1) of a SORT instruction, which is an A-type instruction, are a binary value of 11, the number of operands required for the instruction is three (50 in FIG. 1).

When the number of operands required through instruction interpretation in the instruction interpretation unit 620 is zero, this corresponds to a WRITE instruction. The memory write unit 680 performs a memory WRITE without a memory READ, and the instruction returns to the stand-by state 610.

When the number of operands required through instruction interpretation of the instruction interpretation unit 620 is one, a first memory read unit 640 performs the memory READ once. In this case, when the instruction is a WRITE instruction, the read response unit (or the read response processor) 630 performs a READ response (i.e., responds to the READ instruction), and then the instruction returns to the stand-by state. When the instruction is an I-type instruction, the instruction processing unit 670 processes the corresponding instruction, the memory write unit 680 writes the result to the memory, and then the instruction returns to the stand-by state 610. In this case, it can be seen that the instruction interpretation unit 620 is reused.

When the number of operands required through instruction interpretation of the instruction interpretation unit 620 is two, the first memory read unit (or the first memory read processor) 640 performs the memory READ once, and a second memory read unit (or a second memory read processor) 650 performs the memory READ for the second time. Thus, the memory READ process are performed a total of two times. Also, the instruction processing unit 670 processes the corresponding instruction, and the memory write unit 680 writes the result to the memory. Then, the instruction returns to the stand-by state 610. In this case, it can be seen that the instruction interpretation unit 620, the first memory read unit 640, the instruction processing unit (or the instruction processor) 670, and the memory write unit (or the memory write processor) 680 are reused.

If the number of operands required through the instruction interpretation of the instruction interpretation unit 620 is n, this corresponds to an A-type instruction, which is an acceleration instruction. Therefore, an n-th memory read unit (or an n-th memory read processor) 660 performs the memory READ a number of times equal to the number of operands, the instruction processing unit 670 processes the corresponding instruction, and the memory write unit 680 writes the result to the memory. Then, the instruction returns to the stand-by state 610.

When the instruction is a SORT instruction, which is an A-type instruction, the number of operands required through the instruction interpretation of the instruction interpretation unit 620 is three. Therefore, the n-th memory read unit 660 performs the memory READ three times, the instruction processing unit 670 processes the corresponding instruction, and the memory write unit 680 writes the result to the memory. Then, the instruction returns to the stand-by state 610. In this case, it can be seen that the instruction interpretation unit 620, the instruction processing unit 670, and the memory write unit 680 are reused.

Figure 8:
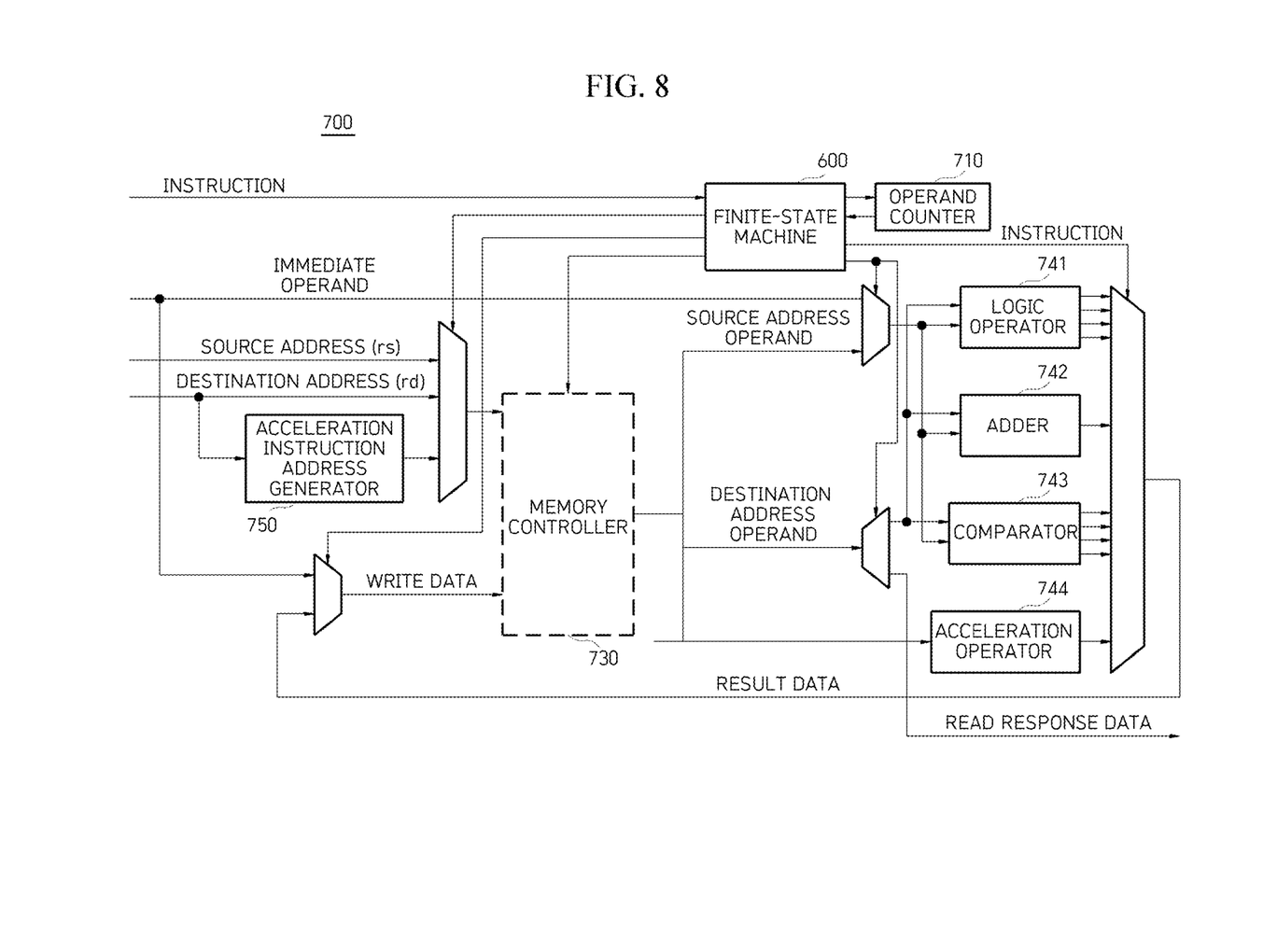
FIG. 8 is a hardware architecture of the computing device including the finite-state machine according to an embodiment of the present disclosure.

FIG. 8 is an architecture diagram of a computing device 700 including a finite-state machine according to an embodiment of the present disclosure.

In general, a memory controller 730 may be located inside the computing device or may be located outside as a device independent of the computing device. However, there is no functional difference between the two cases. In this embodiment, for the brevity of the drawing, the memory controller 730 is located inside the computing device.

The computing device may have devices such as a logic operator 741, an adder 742, a comparator 743, and an acceleration operator 744 to process various instructions and may select a result of one of the devices by interpreting the processed instructions.

Data provided by the memory controller 730 as a response may be classified into rs-operand, rd-operand, and READ response data according to the type of instruction and a control signal of the finite-state machine 600. As an address for accessing the operand, one of rs, rd, and addresses generated by an acceleration instruction address generator 750 is selected according to the processed instruction.

Since the atomic operation of processing-in-memory transfers only a base address for the purpose of efficient bus use, the acceleration instruction address generator 750 generates the addresses of operands necessary for instruction processing based on the base address.

When it is necessary to access three or more operands, the finite-state machine 600 generates an exact operand address through an operand counter 710 and determines the number of operands.

Although the method of the present disclosure and the apparatus using the same have been described with reference to specific embodiments, some or all of their components or operations may be implemented using a computer system having a general-purpose hardware architecture.

The above description of the present disclosure is merely illustrative, and those skilled in the art should understand that various changes in form and details may be made therein without departing from the technical spirit or essential features of the invention. Therefore, the above embodiments are to be regarded as illustrative rather than restrictive. For example, each element described as a single element may be implemented in a distributed manner, and similarly, elements described as being distributed may also be implemented in a combined manner. The scope of the present disclosure is shown by the following claims rather than the foregoing detailed description, and all changes or modifications derived from the meaning and scope of the claims and their equivalents should be construed as being included in the scope of the present disclosure.

What is claimed is:

1. A processing-in-memory control method for efficient instruction processing in a processing-in-memory, the method comprising:
   determining a number of operands required when an instruction in a stand-by state is processed;
   interpreting an instruction being in a stand-by state; and
   processing an instruction corresponding to the number of required operands,
   wherein:
      when the determined number of required operands is zero, the interpreting comprises interpreting the instruction being in the stand-by state as a WRITE instruction, and the processing comprises performing a memory WRITE, and
      when the determined number of required operands is not zero, the processing comprises performing a memory READ in an internal memory of the processing-in-memory a number of times equal to the number of operands required in the interpreted instruction.

2. The method of claim 1, wherein when the determined number of required operands is one, the processing comprises:
   first performing the memory read;
   interpreting whether an instruction to be processed is a READ instruction and responding to the READ when the instruction is the READ instruction; and
   processing the interpreted instruction and writing a result to the memory when the instruction is not the READ instruction.

3. The method of claim 1, wherein when the determined number of required operands is two, the processing comprises:
- first performing the memory READ;
- second performing the memory READ; and
- processing the instruction and writing a result to the memory.

4. The method of claim 1, wherein when the determined number of required operands is three or more, the processing comprises:
- performing the memory READ three or more times; and
- processing the instruction and writing a result to the memory.

5. A processing-in-memory control method for efficient instruction processing in a processing-in-memory, the method comprising:
- determining a number of operands required when an instruction is processed;
- performing a memory WRITE when the number of required operands is zero and the instruction is a WRITE instruction;
- performing a memory READ once and responding to READ when the number of required operands is one and the instruction is a READ instruction;
- performing a memory READ once and performing a memory WRITE when the number of required operands is one and the instruction is not a READ instruction;
- performing a memory READ twice and performing a memory WRITE when the number of required operands is two; and
- performing a memory READ n times and performing a memory WRITE when the number of required operands is n.

6. The method of claim 5, wherein:
- the determining comprises determining the number of operands required for instruction processing as upper two bits of a six-bit instruction value,
- the WRITE instruction has the upper two bits being a binary value of 00, and the number of operands required for the instruction is zero,
- at least one of a READ instruction and an I-type instruction has the upper two bits being a binary value of 01, and the number of operands required for the instruction being one,
- an R-type instruction has the upper two bits being a binary value of 10, and the number of operands required for the instruction is two, and
- a SORT instruction has the upper two bits being a binary value of 11, and the number of operands required for the instruction is three.

7. A processing-in-memory computing device for efficient instruction processing in a processing-in-memory, the device comprising:
- an instruction interpretation processor configured to determine the number of operands required for instruction processing;
- a first memory read processor configured to be performed when the number of required operands is either one or two by instruction interpretation;
- a read response processor configured to be performed when the number of required operands is one and the instruction is a READ instruction;
- a second memory read processor configured to be performed when the number of required operands is two;
- an n-th memory read processor configured to be performed when the number of required operands is three (here, n is a natural number of three or greater);
- an instruction processor configured to be performed when the number of required operands is one and the instruction is not a READ operation or when the number of required operands is two or more; and
- a memory write processor configured to be performed when the number of required operands is one except for a READ operation.

8. The device of claim 7, wherein when the number of required operands is four or greater, the n-th memory read processor is further configured to perform the memory READ a number of times equal to the number of required operands minus three.

* * * * *